(12) United States Patent
Padden et al.

(10) Patent No.: US 8,875,885 B2
(45) Date of Patent: Nov. 4, 2014

(54) PACKAGE FOR SHIPPING HAZARDOUS MATERIAL BOTTLES AND METHOD OF FORMING SAME

(71) Applicant: Honey Cell, Inc., Shelton, CT (US)

(72) Inventors: Bruce J. Padden, Plantsville, CT (US); Jules J. Giorgi, Milford, CT (US)

(73) Assignee: Honey Cell, Inc., Shelton, CT (US)

( * ) Notice: Subject to any disclaimer, the term of this patent is extended or adjusted under 35 U.S.C. 154(b) by 0 days.

(21) Appl. No.: 13/690,637

(22) Filed: Nov. 30, 2012

(65) Prior Publication Data

US 2013/0140213 A1    Jun. 6, 2013

Related U.S. Application Data

(60) Provisional application No. 61/565,685, filed on Dec. 1, 2011.

(51) Int. Cl.
| | |
|---|---|
| *B65D 81/127* | (2006.01) |
| *B65D 5/49* | (2006.01) |
| *B32B 3/26* | (2006.01) |
| *B32B 3/12* | (2006.01) |
| *B65D 81/02* | (2006.01) |
| *B65D 85/30* | (2006.01) |

(52) U.S. Cl.
CPC .......... *B65D 81/022* (2013.01); *B65D 5/48026* (2013.01); *B32B 3/266* (2013.01); *B32B 3/12* (2013.01); *B32B 2439/62* (2013.01); *B65D 85/305* (2013.01); *B65D 65/44* (2013.01); *B32B 3/263* (2013.01)
USPC ....................... 206/433; 206/593; 229/120.34

(58) Field of Classification Search
CPC .. B65D 81/022; B65D 81/025; B65D 81/027; B65D 81/05; B65D 81/127; B65D 81/133
USPC ............ 206/427, 433, 587–594; 229/103.11, 229/120.24–120.26, 120.34, 122.32, 122.34
See application file for complete search history.

(56) References Cited

U.S. PATENT DOCUMENTS

| | | | | | |
|---|---|---|---|---|---|
| 1,582,655 | A | * | 4/1926 | Anderegg | 229/120.34 |
| 1,917,886 | A | * | 7/1933 | George | 206/433 |
| 3,549,007 | A | * | 12/1970 | Charrier | 206/427 |
| 3,749,299 | A | * | 7/1973 | Ingle | 229/120.34 |

(Continued)

OTHER PUBLICATIONS

Picture showing a honeycomb insert used in a package for insertion into a box to form a shipping container for hazardous material bottles; prior to Dec. 1, 2011.

*Primary Examiner* — Bryon Gehman
(74) *Attorney, Agent, or Firm* — Ware, Fressola, Maguire & Barber LLP

(57) ABSTRACT

A package for insertion into a box to form a shipping container for hazardous material bottles, comprises a honeycomb insert having a plurality of side panels and a bottom panel, the side panels and bottom panel having channels formed therein, the insert dimensioned for placement within the box, honeycomb partition members, each member having two panels, each panel of each partition member dimensioned for insertion within a channel of a side panel and a channel of the bottom panel of the insert, the panels adjacent to each other forming a space dimensioned to receive a hazardous material bottle, and a top pad dimensioned for placement over the partition members. A shipping container comprises a box and such a package.

19 Claims, 8 Drawing Sheets

(56) References Cited

U.S. PATENT DOCUMENTS

| | | | | |
|---|---|---|---|---|
| 3,979,882 | A | * | 9/1976 | Howe ............................ 206/433 |
| 4,067,442 | A | * | 1/1978 | Howe ............................ 206/433 |
| 4,223,827 | A | * | 9/1980 | Gilbert ......................... 206/433 |
| 6,536,654 | B2 | * | 3/2003 | Reynolds et al. ........ 229/120.24 |
| 7,644,858 | B2 | * | 1/2010 | Glaser et al. ............. 229/122.32 |
| 7,954,637 | B2 | * | 6/2011 | Hausmann ............... 229/120.36 |
| 8,162,143 | B2 | * | 4/2012 | Hausmann ............... 229/120.36 |
| 8,474,686 | B2 | * | 7/2013 | Glaser et al. ............. 229/122.34 |

\* cited by examiner

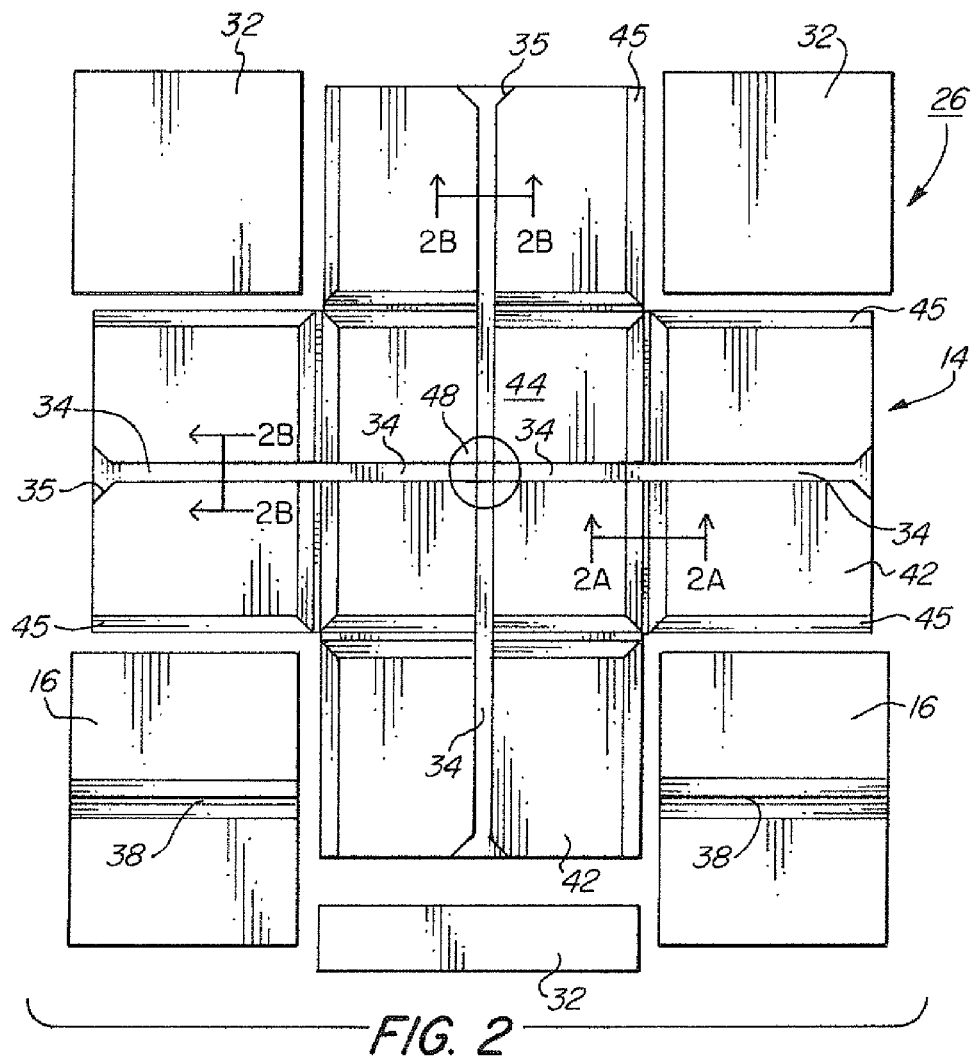
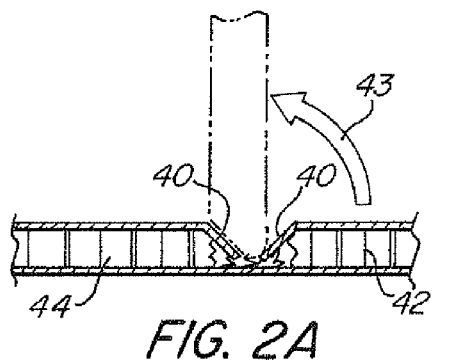
FIG. 2A
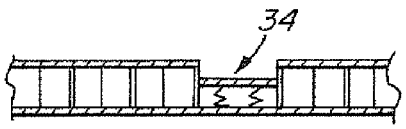
FIG. 2B
FIG. 2

PACKAGE FOR SHIPPING HAZARDOUS MATERIAL BOTTLES AND METHOD OF FORMING SAME

CROSS REFERENCE TO RELATED APPLICATION

This application claims priority under 35 USC §119(e) to U.S. Provisional Patent Application No. 61/565,685 filed on Dec. 1, 2011, whose entire contents are hereby incorporated by reference.

TECHNICAL FIELD

The present invention is directed to a package for shipping (transporting) hazardous material bottles and a method of manufacturing such a package, especially four liter size hazardous material bottles.

BACKGROUND OF THE INVENTION

Hazardous material bottles, especially four liter size hazardous material bottles, are used in the industry for shipping (transporting) and storing various types of hazardous liquids, such as acids and the like and are typically manufactured from glass and are typically amber in color. These bottles can contain acid and other types of hazardous materials.

When such bottles are to be shipped, it is necessary that they be shipped in a shipping container which can withstand substantial forces and still maintain the integrity of the hazardous material bottles within the container. Such shipping includes all types, such as shipping by air transportation, marine transportation, and ground transportation.

Such shipping of hazardous materials in bottles, especially four liter bottles, must be extremely robust and reliable, since breakage of such a bottle(s) with hazardous material can cause an environmental hazard requiring expensive and time-consuming clean-up and remediation. It is imperative that such breakage be minimized and therefore such shipping containers must be very secure, safe, and resilient.

In the past, such a shipping container has included foam type inserts which are dimensioned for receipt of such bottles, the inserts typically being placed within a corrugated type box, the combination forming the shipping container. Other forms of shipping containers use such boxes, wherein the hazardous material bottles are separated from each other by use of either corrugated board or honeycomb material, such as that manufactured by the present assignee, Honey Cell, Inc.

Typical prior art hazardous material bottle shipping containers are found, for example, at www.labsafety.com and www.freundcontainer.com web sites.

There has been a need for a package for placement within a corrugated box to form a shipping container, the package designed to protect a plurality of hazardous material bottles stored therein.

SUMMARY OF THE INVENTION

The present invention is directed to a package for protecting a plurality of hazardous material bottles, especially four liter size bottles, the package dimensioned for placement within a corrugated box, the combination forming a shipping container for shipping and storage of such hazardous material bottles in commerce.

Typical hazardous material bottles are of the four liter capacity type. The package of an embodiment of the present invention is dimensioned for protecting such four liter hazardous material bottles. The package can also be designed to ship and/or store fewer or greater number of bottles.

It can also be designed for bottles having sizes other than standard four liter bottles. The package comprises three components; namely, a die cut insert, partition members, and a top pad. These components are typically fabricated from honeycomb panel material, such as that sold by Honey Cell, Inc., of Bridgeport, Conn. This package is designed for insertion into a corrugated box of standard design, to form a shipping container.

The present invention is also directed to such a shipping container; that is, the above-recited package and the corrugated box.

The honeycomb die cut insert includes side panels and a bottom panel. The bottom panel typically includes a hole to allow air to escape as the insert is inserted into a corrugated box. The side panels are folded relative to the bottom panel and once folded inserted into the corrugated box. The die cut insert thereby covers the bottom of the corrugated box and supports the bottoms of the hazardous material bottles placed therein. The die cut insert once folded also forms four sides of the package which provide structural integrity, as well as shock absorbing functionality to the shipping container.

Two partition members each having two panels, are also incorporated in the package. These two partition members are placed into channels which are formed in the honeycomb die cut insert. These channels are located on the bottom and sides of the die cut insert and position the partition members to form an overall partition that physically separates the hazardous material bottles from each other when inserted into the shipping container. The channels in the die cut insert thereby position and secure the partition members so as to form a partition (space) that prevents lateral movement of the partition when the shipping container is closed.

It is further noted that the side channels in the die cut insert has a guide region that is generally V-shaped which facilitates entry of the partition members. The channels thereby help lead the partition members into the channel for easy assembly of the package. Once the partition members are inserted, the hazardous material bottles can be placed within the spaces formed by adjacent panels of the partition members. A top pad of a honeycomb panel construction can be placed on top of the bottles and the shipping container closed by closing the flaps of the corrugated box. This top pad may be thicker than the die cut insert and the partition members.

An embodiment of the present invention is a package for insertion into a corrugated box to form a shipping container for hazardous material bottles, comprising: a honeycomb insert having a plurality of side panels and a bottom panel, the side panels and bottom panel having channels formed therein, the insert dimensioned for placement within the corrugated box; honeycomb partition members, each member having two panels, each panel of each partition member dimensioned for insertion within a channel of a side panel and a channel of the bottom panel of the insert, the panels adjacent to each other forming a space dimensioned to receive a hazardous material bottle; and a top pad dimensioned for placement over the partition members.

Another embodiment of the present invention is the package as described above, wherein the honeycomb insert includes fold zones between the bottom panel and each side panel, each fold zone including a compression of the bottom panel and the side panel in said fold zone so as to facilitate folding of each side panel relative to the bottom panel.

A further embodiment of the present invention is the package as described above, wherein each side panel can be folded perpendicular relative to the bottom panel.

A still further embodiment of the present invention is the package as described above, wherein each side panel includes two sides, each side compressed to facilitate contact between sides of adjacent side panels.

Another embodiment of the present invention is the package as described above, wherein the top pad has a thickness greater than a thickness of the honeycomb insert.

A further embodiment of the present invention is the package as described above, wherein the honeycomb insert and the honeycomb partition members are fabricated from a honeycomb panel blank.

A still further embodiment of the present invention is the package as described above, wherein each side panel of the die cut insert and each panel of the die cut partition members has a height that is at least equal to or slightly greater than a shoulder height of a hazardous material bottle inserted within the space dimensioned to receive said hazardous waste bottle.

Another embodiment of the present invention is the package as described above, wherein the side channels of the side panels have an upper guide region to facilitate receipt of a panel of a partition member.

Another embodiment of the present invention is a shipping container comprising a corrugated box; and a package dimensioned for insertion in said corrugated box, the package having a honeycomb insert having a plurality of side panels and a bottom panel, the side panels and bottom panel having channels formed therein, the insert dimensioned for placement within the corrugated box; honeycomb partition members, each member having two panels, each panel of each partition member dimensioned for insertion within a channel of a side panel and a channel of the bottom panel of the insert, the panels adjacent to each other forming a space dimensioned to receive a hazardous material bottle; and a top pad dimensioned for placement over the partition members.

Another embodiment of the present invention is the shipping container as described above, wherein the honeycomb insert includes fold zones between the bottom panel and each side panel, each fold zone including a compression of the bottom panel and the side panel in said fold zone so as to facilitate folding of each side panel relative to the bottom panel.

A further embodiment of the present invention is the shipping container as described above, wherein each side panel can be folded perpendicular relative to the bottom panel.

A still further embodiment of the present invention is the shipping container as described above, wherein each side panel includes two sides, each side compressed to facilitate contact between sides of adjacent side panels.

Another embodiment of the present invention is the shipping container as described above, wherein the top pad has a thickness greater than a thickness of the honeycomb insert.

A further embodiment of the present invention is the shipping container as described above, wherein the honeycomb insert and the honeycomb partition members are fabricated from a honeycomb panel blank.

A still further embodiment of the present invention is the shipping container as described above, wherein each side panel of the die cut insert and each panel of the die cut partition members has a height that is at least equal to or slightly greater than a shoulder height of a hazardous material bottle inserted within the space dimensioned to receive said hazardous waste bottle.

A further embodiment of the present invention is the shipping container as described above, wherein the side channels of the side panels have an upper guide region to facilitate receipt of a panel of a partition member.

Another embodiment of the present invention is a honeycomb die cut panel crushed and cut to form a honeycomb die cut insert having a plurality of side panels and a bottom panel, the side panels and bottom panel having channels formed therein, the insert dimensioned for placement within a box, and honeycomb partition members, each member having two panels, each panel of each partition member dimensioned for insertion within a channel of a side panel and a channel of the bottom panel of the insert, the panels adjacent to each other forming a space dimensioned to receive a hazardous material bottle.

BRIEF DESCRIPTION OF THE DRAWINGS

For a fuller understanding of the nature and objects of the invention, reference is made to the following detailed description taken in conjunction with the accompanying photographs (drawings) in which:

FIG. 2 illustrates a honeycomb die cut insert and honeycomb die cut partition members formed from a honeycomb die cut panel after fabrication by a die cutter machine and further illustrates portions of the die cut panel which are not used to form the package according to an embodiment of the present invention.

FIG. 2A is a cross-sectional view taken along line 2A-2A of FIG. 2 of the honeycomb die cut insert illustrating how side panels of the honeycomb die cut insert are folded relative to the bottom panel of the honeycomb die cut insert.

FIG. 2B is a cross-sectional view taken along line 2B-2B of FIG. 2 showing how channels are formed in the side panels of the honeycomb die cut insert for receipt of the honeycomb die cut partition members.

DETAILED DESCRIPTION

Figure 1:
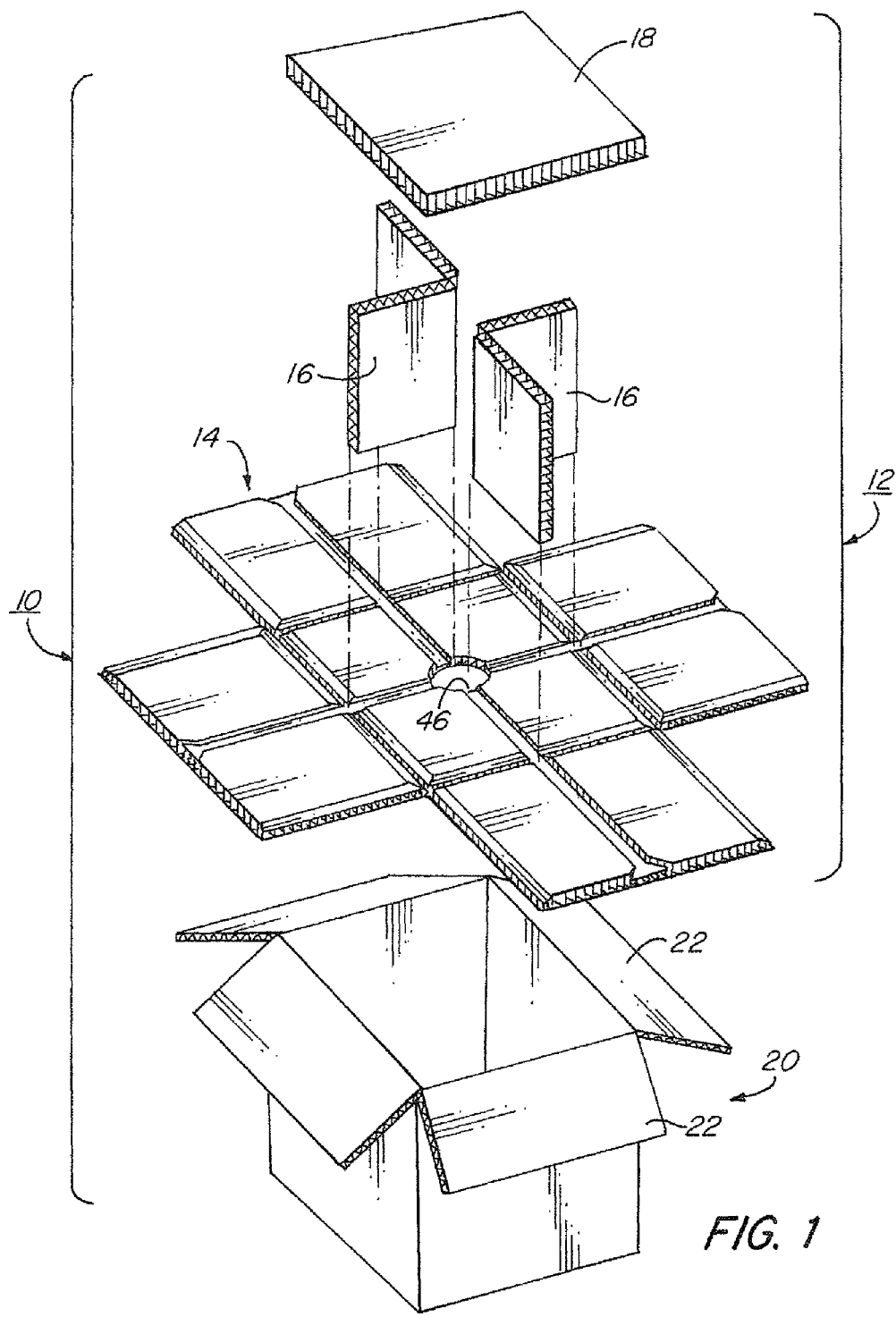
FIG. 1 is an exploded perspective view of a package according to the present invention for insertion into a box to form a shipping container.

As seen in FIGS. 1 and 3-8, an embodiment of the present invention is directed to a shipping container 10 which includes a package 12 according to the present invention.

In particular, the package 12 includes a honeycomb die cut insert 14 and two honeycomb die cut partition members 16 which are inserted into the die cut insert. When assembled, the package has an overall configuration as shown in FIGS. 4-6 and 8. In addition, the package includes a top pad 18 formed from honeycomb panel material which is placed over the honeycomb die cut insert 14 and honeycomb die cut partition members 16 to form the overall package 12.

The shipping container further includes a corrugated box 20 into which the package is inserted such that when the flaps 22 of the corrugated box are closed, a shipping container is formed which is able to protect hazardous material bottles 24. The honeycomb die cut insert 14 and honeycomb die cut partition members 16 are formed from a single honeycomb panel blank 26, such as shown in FIGS. 2, 2A and 2B prior to operations as described below for forming the package components.

As seen in FIGS. 2, 2A and 2B, the honeycomb panel blank 26 (such as a ⅝ inch thick honeycomb panel blank) is cut and crushed by a die cutter (not shown) so as to form the honeycomb die cut insert 14 and the two honeycomb die cut partition members 16. The honeycomb panel is well-known in the art, such as the honeycomb blanks manufactured by Honey Cell Inc. of Bridgeport, Conn.

As seen in FIG. 2A, side panels 42 and bottom panel 44 of honeycomb die cut insert 14 are crushed relative to each other so as to form a V-shaped fold zone 40. The arrow 43 shows that the side panel 42 is able to be rotated 90 degrees relative to bottom panel 44 so as to be perpendicular to the bottom panel when inserted within the corrugated box as best seen in cross-section in FIG. 8.

Figure 4:
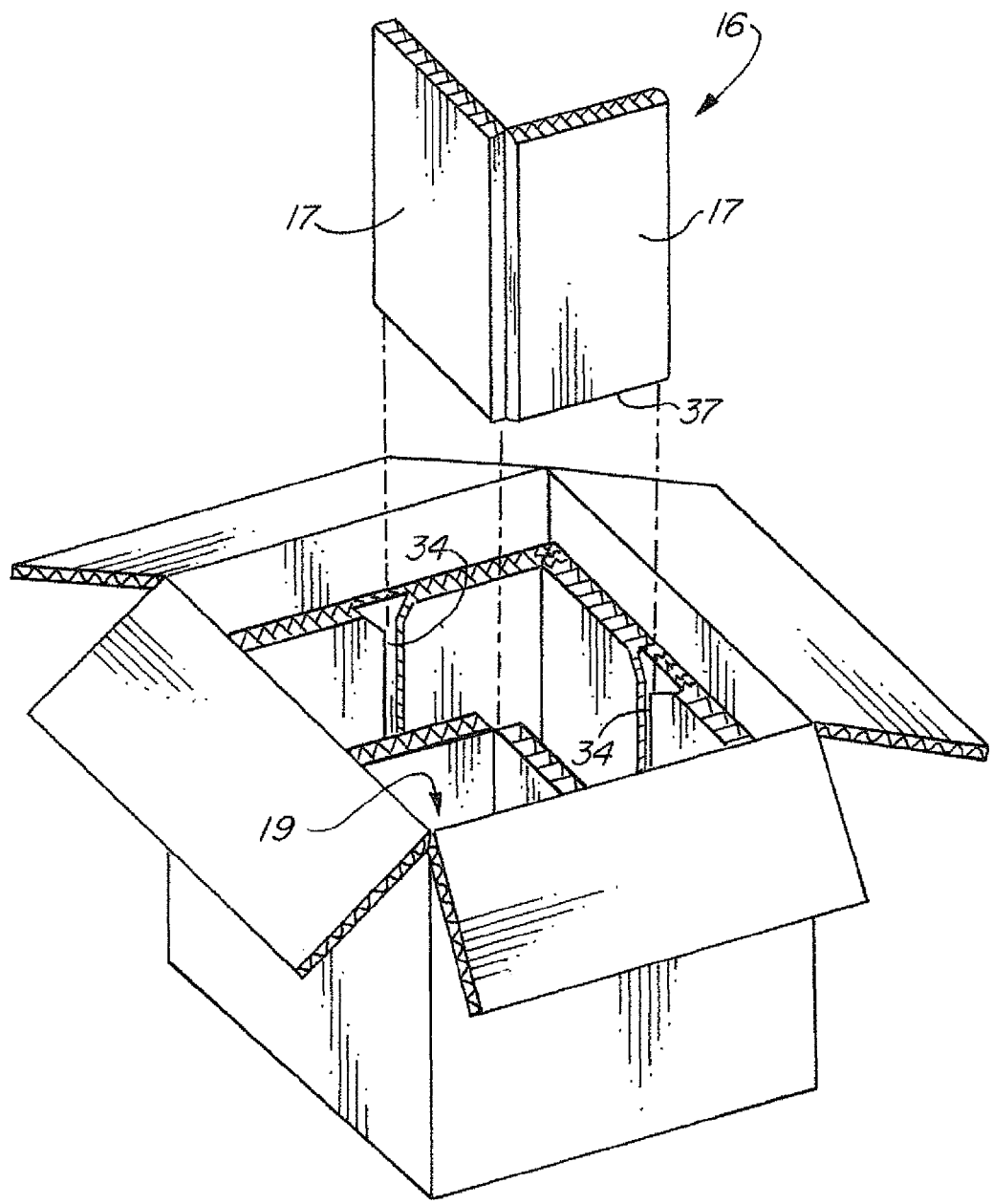
FIG. 4 is a perspective view of the box, honeycomb die cut insert positioned in the box and further illustrating how the honeycomb die cut partition members are installed relative to the honeycomb die cut insert channels.

FIG. 2B shows that each side panel 42 is also crushed along a midsection of each panel to form a channel 34 for receipt of a panel of one of the partition members 16. In addition, each side panel 42 at the upper termination of each channel 34 includes a crushed guide region 35 to facilitate the insertion of each panel of the partition member within a corresponding channel of the side panels 42. This guide region is generally V-shaped. This is illustrated in FIG. 4.

Furthermore, the bottom panel 44 also includes channels 34 corresponding and in alignment with the channels of the side panels. These channels are again crushed zones within the bottom panel 44 for receipt of the bottom portion 37 of each panel 17 of the partition member 16.

Figure 3:
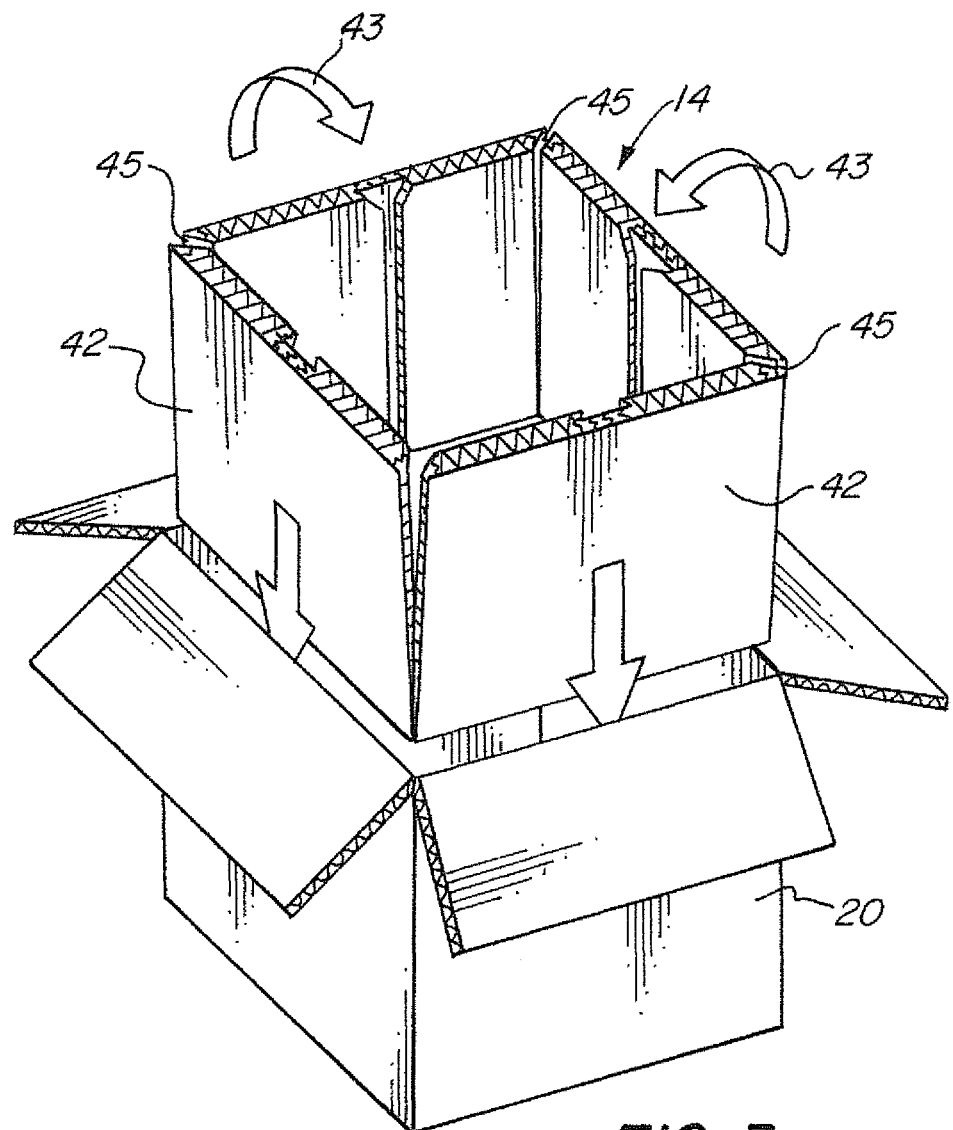
FIG. 3 is an exploded perspective view of the box and honeycomb die cut insert illustrating how the honeycomb die cut insert is inserted into the box.

Also, each side panel 42 at its terminating sides 45 is crushed to form a generally 45 degree slope as best seen in FIGS. 2 and 3 so as to facilitate adjacent sides abutment (contact) to each other when the honeycomb die cut insert 14 is inserted within the box 20 as best seen in FIG. 3. To facilitate such insertion, the bottom panel 44 of the die cut insert 14 includes a central hole 46 as best seen in FIG. 1. This central hole allows air to pass through as the insert 14 is pushed downwardly into box 20. The central hole is formed by removal of a die cut disk 48 in blank 26 as seen in FIG. 2.

Referring again to FIG. 2, once the honeycomb blank has been cut and crushed to form the honeycomb die cut insert 14 and the two honeycomb die cut partition members 16. There are also typically three pieces of scrap formed as denoted by scrap members 32. Depending upon the configuration of blank 26, it would be possible to use one of these scrap members as the top pad 18 of the present invention in situations in which the top pad thickness can be the same as that of the die cut insert 14 and partition member 16.

In the preferred embodiment of the present invention as seen in the figures, the top pad 18 typically has a thickness which is substantially greater than that of the die cut insert 14 and partition member 16 in order to provide sufficient protection to bottles 24 placed within the shipping container 10.

Figure 5:
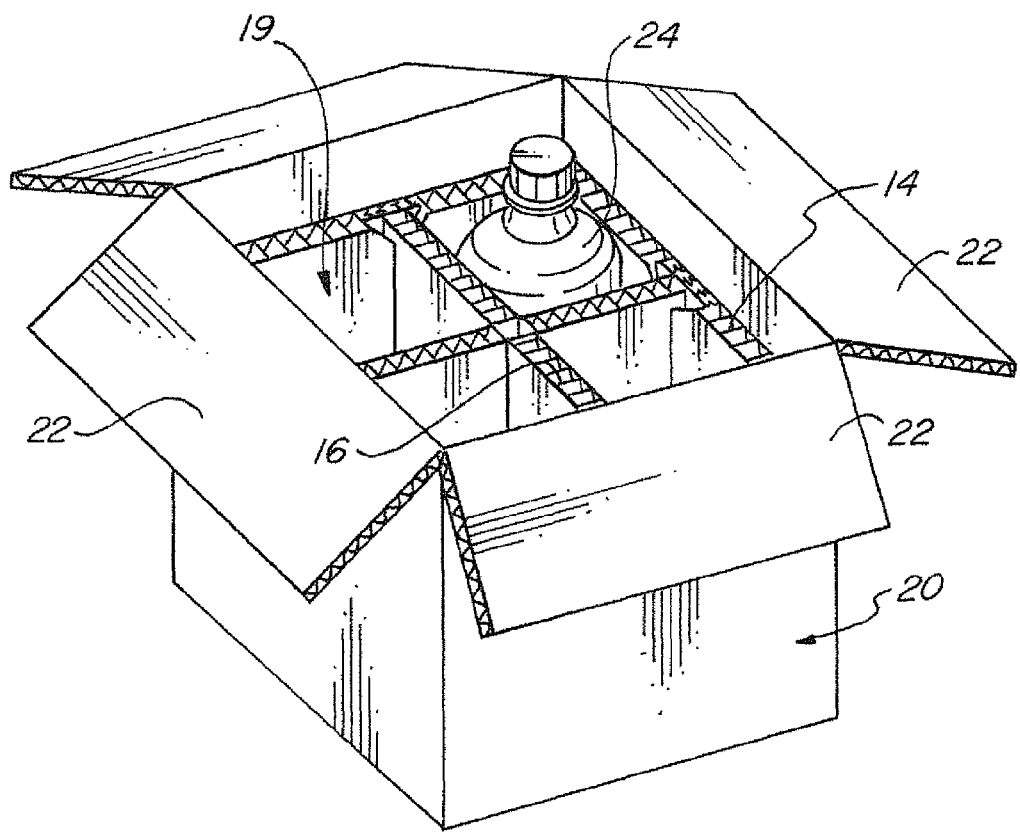
FIG. 5 is a perspective view of the package and corrugated box forming the overall shipping container, showing insertion of a hazardous material bottle prior to closing the shipping container and thus not showing the top pad forming part of the overall package.

As seen in FIG. 2, each partition member 16 is cut below fold line 38 thereby allowing each partition member to be configured into two panels 17 thereby allowing the partition member to be inserted within channels 34 of insert 14. As seen in FIGS. 4 and 5, adjacent panels 17 form a space 19 dimensioned to receive a hazardous material bottle 24.

As discussed above and as best seen in FIGS. 1 and 2, the bottom panel 44 of insert 14 preferably includes a central hole 46 (by removal of die cut disc 48 as shown in FIG. 2). This hole facilitates inserting insert 14 into corrugated box 20 as also shown in FIG. 3 (insert shown partially inserted into corrugated box 20) by allowing air to escape through the hole as the insert is being inserted into the corrugated box.

Figure 6:
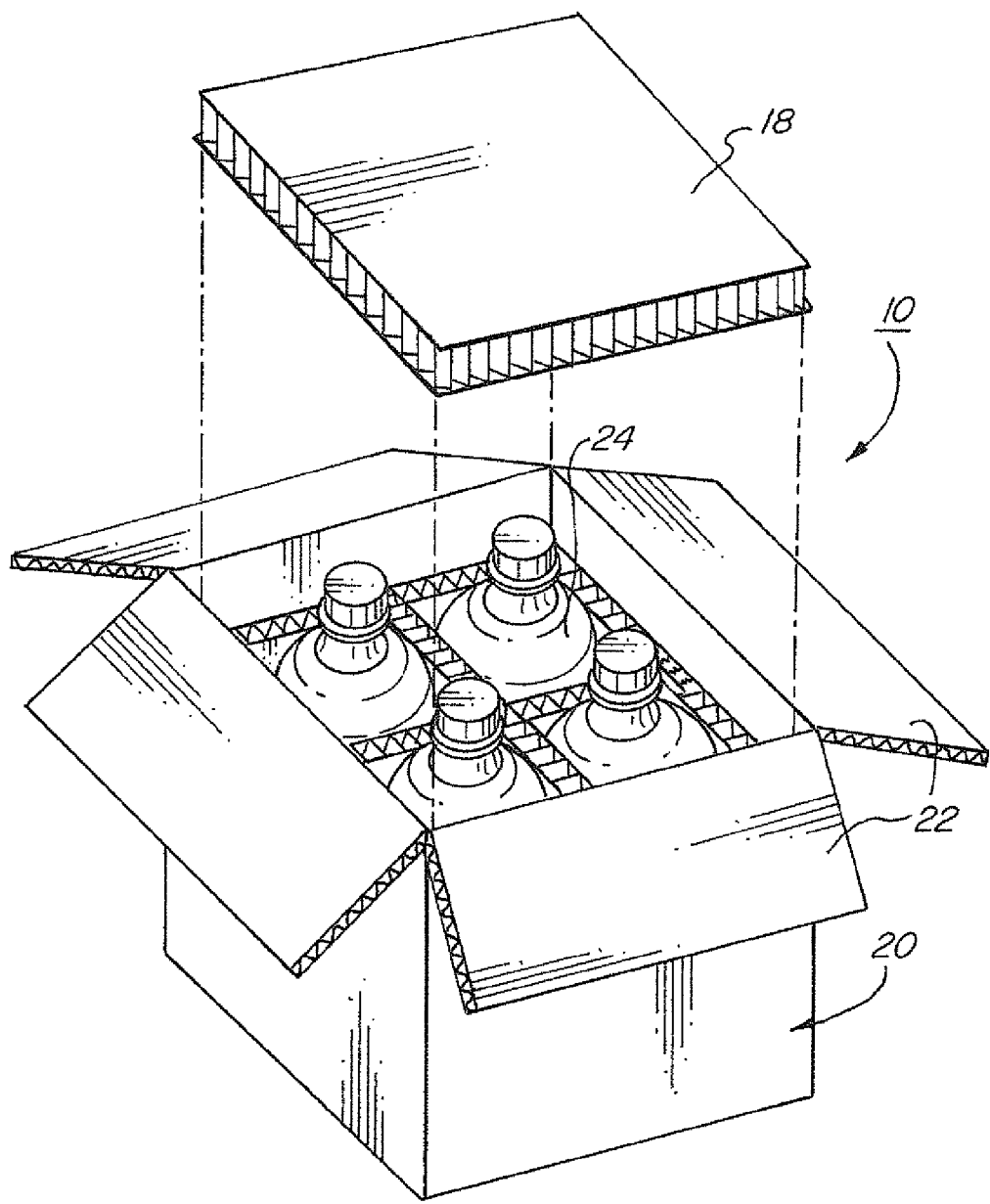
FIG. 6 is a perspective view of the overall shipping container including the package, the corrugated box, and the top panel ready for placement over hazardous material bottles placed within the package.
Figure 7:
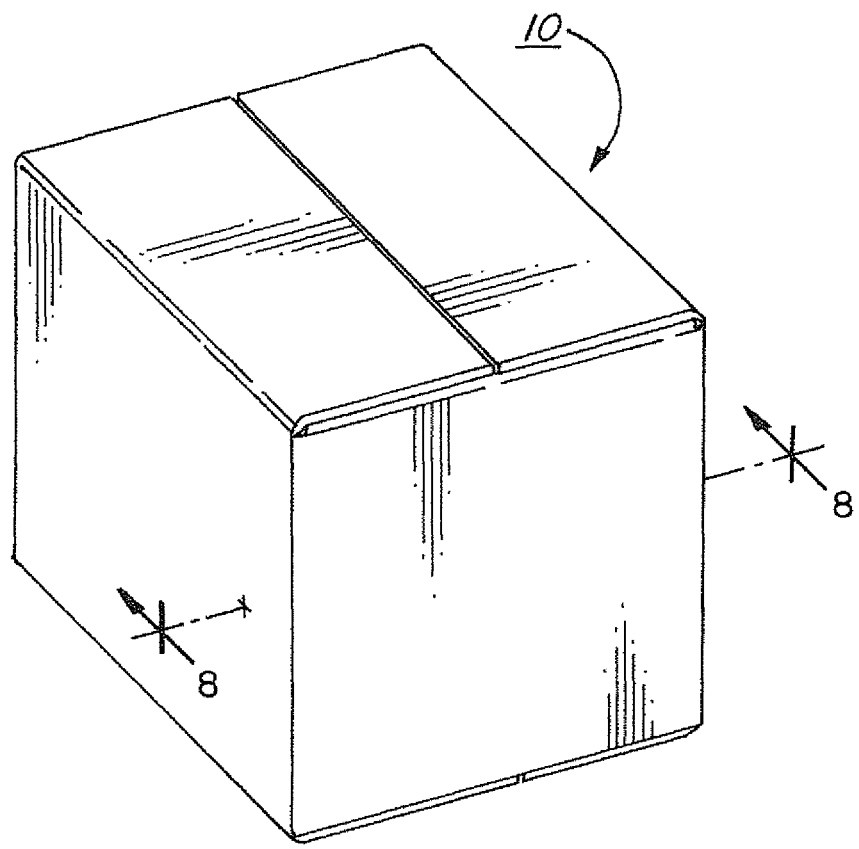
FIG. 7 is a perspective view similar to the perspective views of FIGS. 3, 4, 5 and 6 showing the shipping container in its closed configuration.
Figure 8:
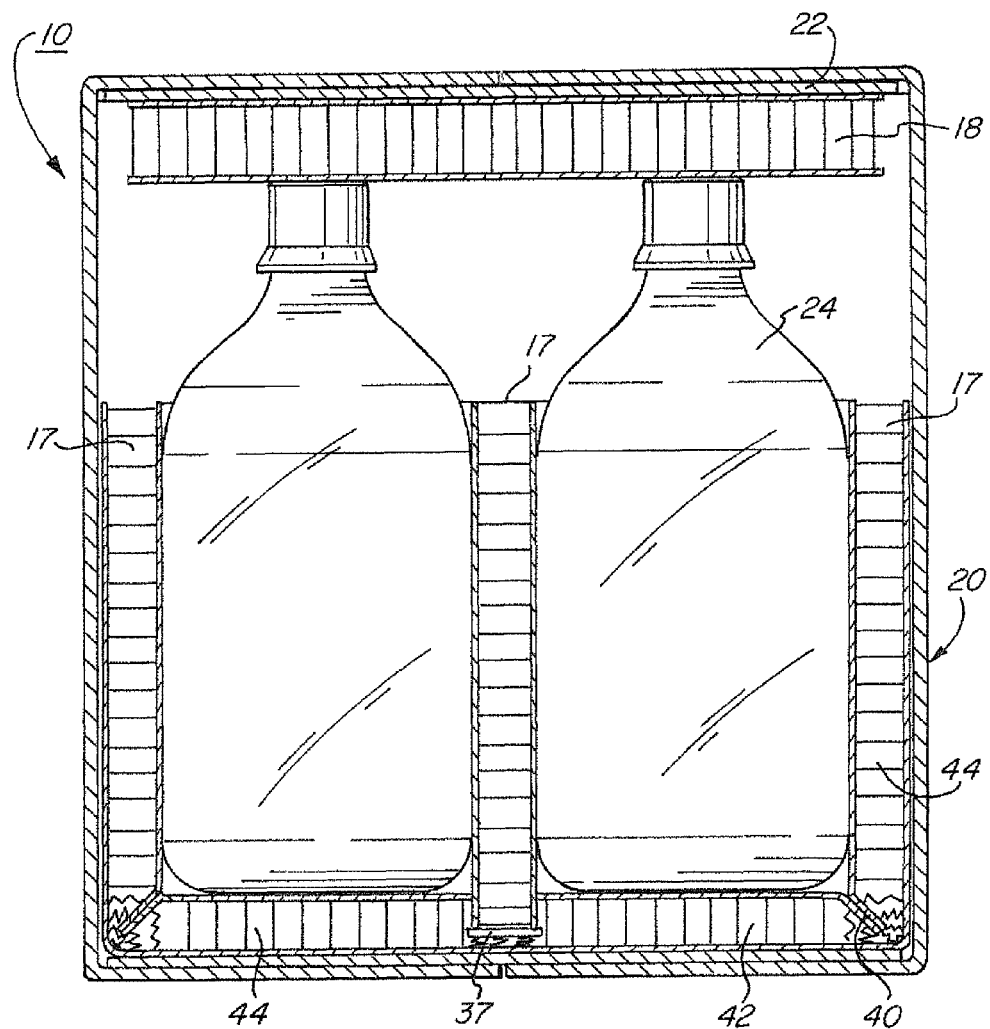
FIG. 8 is a cross-sectional view of the shipping container taken along line 8-8 of FIG. 7 showing the shipping container with hazardous material bottles placed therein with the overall shipping container ready for shipment.

FIGS. 6 and 8 show the shipping container 10 with the package 12 inserted therein, as well as one or more hazardous material bottles 24 placed within the space 19 formed by two panels 17. Bottles 24 are typically of the standard four liter type. As seen in FIGS. 4-6 and 8, the side panels 42 of die cut insert 14 and the panels 17 of die cut partition members 16 may have a height that is at least slightly greater than shoulder height of bottles 24 to provide protection to the cylindrical portion of the bottles. The height of these members may of course be at other heights relative to the bottles, including less than, equal to or greater than the shoulder height of the bottles.

FIG. 6 shows the package 12 with top pad 18 ready to be placed over bottles 24, while FIG. 8 shows the top pad in position over the bottles with flaps 22 of corrugated box 20 folded over. Top pad 18 is also typically formed from a honeycomb panel, such as a one inch thick honeycomb panel. The increased thickness of top pad 18 is to provide sufficient protection to the tops of bottles 24 as best seen in FIG. 8.

The overall result is a package for insertion into a corrugated box so as to form a shipping container which is particularly suitable for the storage and transport of hazardous material bottles and thereby able to withstand rough treatment to the storage container while maintaining the integrity of the storage container and the bottles therein.

Assembly of the package within the shipping container can be summarized as follows:

Placing the honeycomb die cut insert 14 so as to fold the side panels 42 at approximately 90 degrees relative to bottom panel 44, inserting the folded die cut insert 14 into corrugated box 20;

Placing partition members 16 into channels 34 formed within the die cut insert 14;

Placing hazardous material bottles 24 between the partitions 19 formed by partition member panels 17; and Placing the honeycomb top pad 18 over the bottles.

The bottles can be inserted into the package either by hand or by an automated stacker/loader.

Finally, the shipping container 10 can be shipped to the location where the bottles are to be later filled, with the filled bottles placed back into the shipping container and the shipping container then closed by folding flaps 22 and sealing the flaps so as to form a secure shipping container 10. Of course, filled bottles can be initially placed with the shipping container.

The benefits of package 12 according to the present invention is that the honeycomb die cut insert and honeycomb die cut partition members can be fabricated from a single honeycomb blank 26, such as shown in FIG. 2; thereby facilitating manufacture of the package since all of the components thereof except for the top pad 18 are formed by a single operation of a die cutter machine. By forming the honeycomb die cut insert and honeycomb die cut partition members from the same honeycomb blank, waste of material from the honeycomb blank is minimized and fewer components to inventory are necessary in order to form the package according to the present invention. This also reduces set up time and minimizes scrap as mentioned above. Labor associated with forming the honeycomb die cut insert and honeycomb die cut partition members is also minimized in this manufacturing technique. It should be noted that top pad 18 could be formed from the same blank 26 if the thickness of the top pad can (for a particular shipping container) be the same as the thickness of the die cut insert and the die cut partition members.

The overall result is a package and shipping container that is able to protect hazardous material bottles exceeding traditional test criteria associated with such storage containers in which the package is an integral part.

Furthermore, the honeycomb die cut components of the present invention can be formed from 100% recyclable and biodegradable material.

Furthermore, the channels 34 formed in the die cut insert help locate the partition member 16 and keep them from moving once placed therein so as to securely restrain the hazardous material bottles once placed within the package.

Furthermore, the hole 46 formed in the bottom panel 44 of the honeycomb die cut insert facilitates insertion of the die cut insert into a corrugated box by a allowing air to escape when pushing the insert into the box. This minimizes the labor and time necessary to form the package within the corrugated box.

The package and overall storage container formed from the present invention are particularly suitable for auto loading hazardous material bottles into the package since the partitions will remain in position as the bottles are placed between the partition members.

Furthermore, accuracy of filling machines used to load the bottles with material is facilitated since the space between the partition members is maintained while the bottles are removed and reinserted into the package;

thereby facilitating placement of the bottles in the package without interference with the partition members.

Although the package 12 shown in the embodiment illustrated in the figures is able to ship and store four hazardous material bottles therein (typically of the four liter capacity type), the package can also be designed for shipping and storage of fewer bottles and, depending upon the configuration of the honeycomb blank, can be designed for more than four bottles.

The overall package according to the present invention thereby provides for secure shipping and storage of hazardous material bottles in the overall shipping container while minimizing the material associated with the components forming the package according to the present invention. The honeycomb die cut insert and honeycomb die cut partition members can be fabricated from a single honeycomb panel blank and easily formed by a die cutter machine.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A package for insertion into a box to form a shipping container for hazardous material bottles, comprising:

a honeycomb insert having a plurality of side panels and a bottom panel, the side panels and bottom panel having channels formed therein, the insert dimensioned for placement within the box; and honeycomb partition members, each member having two panels, each panel of each partition member dimensioned for insertion within a channel of the channels of one of the side panels and a channel of the channels of the bottom panel of the insert, the panels adjacent to each other forming a space dimensioned to receive a hazardous material bottle;

wherein the honeycomb insert includes fold zones between the bottom panel and each side panel, each fold zone including a compression of the bottom panel and the side panel in said fold zone so as to facilitate folding of each side panel relative to the bottom panel.

2. The package according to claim 1, wherein each side panel can be folded perpendicular relative to the bottom panel.

3. The package according to claim 2, wherein each side panel includes two sides, each side compressed to facilitate contact between sides of adjacent side panels.

4. The package according to claim 1, wherein each side panel includes two sides, each side compressed to facilitate contact between sides of adjacent side panels.

5. The package according to claim 1, wherein the top pad has a thickness greater than a thickness of the honeycomb insert.

6. The package according to claim 1, wherein the honeycomb insert and the honeycomb partition members are fabricated from a honeycomb panel blank.

7. The package according to claim 1, wherein each side panel and each panel of the partition members has a height that is at least equal to or slightly greater than a shoulder height of a hazardous material bottle inserted within the space dimensioned to receive said hazardous material bottle.

8. The package according to claim 1, wherein the channels of the side panels have an upper guide region to facilitate receipt of a panel of a partition member.

9. The package according to claim 1, further comprising a top pad dimensioned for placement over the partition members.

10. A shipping container comprising:

a box; and a package dimensioned for insertion in said box, the package having:

a honeycomb insert having a plurality of side panels and a bottom panel, the side panels and bottom panel having channels formed therein, the insert dimensioned for placement within the box;

honeycomb partition members, each member having two panels, each panel of each partition member dimensioned for insertion within a channel of the channels of one of the side panels and a channel of the channels of the bottom panel of the insert, the panels adjacent to each other forming a space dimensioned to receive a hazardous material bottle;

wherein the honeycomb insert includes fold zones between the bottom panel and each side panel, each fold zone including a compression of the bottom panel and the side panel in said fold zone so as to facilitate folding of each side panel relative to the bottom panel.

11. The shipping container according to claim 10, wherein each side panel can be folded perpendicular relative to the bottom panel.

12. The shipping container according to claim 11, wherein each side panel includes two sides, each side compressed to facilitate contact between sides of adjacent side panels.

13. The shipping container according to claim 10, wherein each side panel includes two sides, each side compressed to facilitate contact between sides of adjacent side panels.

14. The shipping container according to claim 10, wherein the top pad has a thickness greater than a thickness of the honeycomb insert.

15. The shipping container according to claim 10, wherein the honeycomb insert and the honeycomb partition members are fabricated from a honeycomb panel blank.

16. The shipping container according to claim 10, wherein each side panel and each panel of the partition members has a height that is at least equal to or slightly greater than a shoulder height of a hazardous material bottle inserted within the space dimensioned to receive said hazardous material bottle.

17. The shipping container according to claim 10, wherein the side channels of the panels have an upper guide region to facilitate receipt of a panel of a partition member.

18. The shipping container according to claim 10, further comprising a top pad dimensioned for placement over the partition members.

19. A honeycomb die cut panel crushed and cut to form:
a honeycomb die cut insert having a plurality of side panels and a bottom panel, the side panels and bottom panel having channels formed therein, the insert dimensioned for placement within a box, and
honeycomb partition members, each member having two panels, each panel of each partition member dimensioned for insertion within a channel of the channels of one of the side panels and a channel of the channels of the bottom panel of the insert, the panels adjacent to each other forming a space dimensioned to receive a hazardous material bottle;

wherein the honeycomb insert includes fold zones between the bottom panel and each side panel, each fold zone including a compression of the bottom panel and the side panel in said fold zone so as to facilitate folding of each side panel relative to the bottom panel.

\* \* \* \* \*

UNITED STATES PATENT AND TRADEMARK OFFICE
CERTIFICATE OF CORRECTION

PATENT NO. : 8,875,885 B2  
APPLICATION NO. : 13/690637  
DATED : November 4, 2014  
INVENTOR(S) : Bruce J. Padden et al.

Page 1 of 1

It is certified that error appears in the above-identified patent and that said Letters Patent is hereby corrected as shown below:

In the Claims

Column 8, line 19, Claim 1, line 4, please insert the word --each-- before the word "having".

Column 8, line 64, Claim 10, line 5, please insert the word --each-- before the word "having".

Column 10, line 13, Claim 19, line 3, please insert the word --each-- before the word "having".

Signed and Sealed this  
Seventh Day of April, 2015

Michelle K. Lee  
*Director of the United States Patent and Trademark Office*